C. BUSH.
Bake Pan.

No. 33,514. Patented Oct. 22, 1861.

Witnesses:

Inventor:
Chauncy Bush
by Munn & Co.
attys

UNITED STATES PATENT OFFICE.

CHAUNCEY BUSH, OF NEW YORK, N. Y.

IMPROVEMENT IN CAMP PANS AND BAKERS.

Specification forming part of Letters Patent No. 33,514, dated October 22, 1861.

*To all whom it may concern:*

Be it known that I, CHAUNCEY BUSH, of 77 Cedar street, in the city, county, and State of New York, have invented a new and Improved Camp Pan and Baker; and I do hereby declare the following to be a full, clear, and exact description of the same, reference being had to the accompanying drawings, making a part of this specification, in which—

Figure 1:
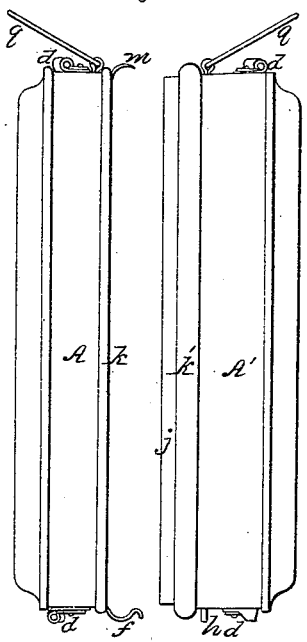
Figure 3:
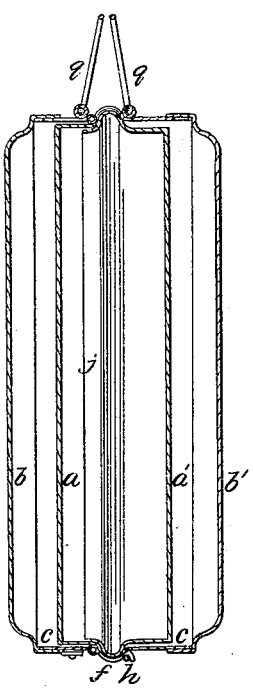
Figure 2:
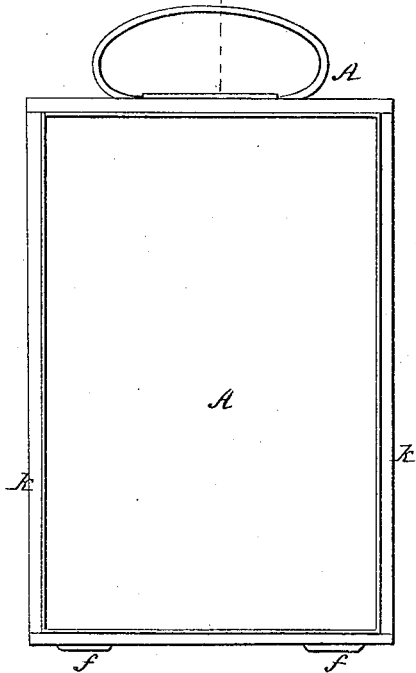
Figure 4:
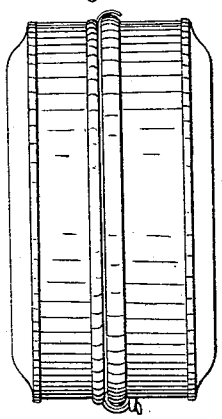
Figure 5:
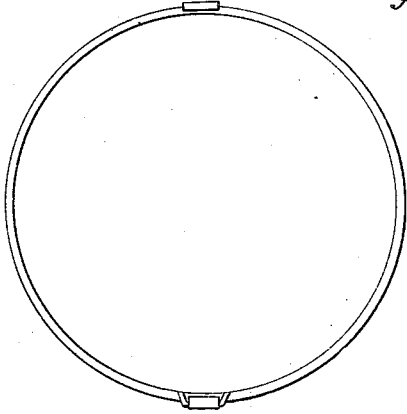

Figure 1 is a side elevation of the two pans disconnected. Fig. 2 is a top view of the same, and Fig. 3 is a vertical section of the same, taken in the line $x\,x$, Fig. 2. Fig. 4 is a side elevation of two pans of circular form united together to be used as a baker. Fig. 5 is a top view of the same.

Similar letters of reference indicate corresponding parts in the several figures.

The object of this invention is to obtain a cooking utensil of convenient and compact form for soldiers' and hunters' use; and it consists of two pans constructed with double sides and bottoms with non-conducting material interposed between them, the pans being adapted to be used either singly, in the ordinary way, or attached together to form a baker, which when filled with the article to be baked is buried in hot ashes or placed in an open fire and the article cooked in an expeditious manner without danger of injury thereto from excessive heat.

To enable others skilled in the art to fully understand my invention, I will proceed to describe it.

A A' are two pans constructed with inner and outer walls $a\,b\,a'\,b'$. The outer walls are furnished with openings $c\,c$, (shown in Fig. 3,) through which cement, sand, plaster, or other non-conducting material is introduced into the space between the inner and outer walls of the pans.

The openings in the pans, after the space between their walls is filled, are closed by slides $d\,d$, pivoted at one end to the pan, or they may be permanently closed by screws, pins, or otherwise.

One of the pans A' is made a little deeper than the other and is furnished on its top edge with a flange $j$, and both near the top are furnished with beads $k\,k'$, which extend entirely around the outer surface of the pans and form the junction of the baker when the pans are put together. The flange $j$ on the pan A', fitting the inner sides of the pan A, forms a perfectly-tight joint.

To fasten the pans together, the shallow pan A is provided at one end with two hooks $f\,f$ and at the other with a metal spring-clasp $m$; or the fastening may be by a male and female screw cut on the respective parts. The hooks $f\,f$ catch into the metal straps $h\,h$ on one end of the pan A' and form a hinge-joint. The pans at the opposite end are fastened by means of the spring-clasp $m$, which fits over the bead on the pan A and firmly locks the two together. The pans are also provided at one end with two handles $q\,q$.

To use the pans for baking any article of food, such as bread, meats, and vegetables, the article is first put into one of the pans and then covered by the other, and the two fastened together in the manner above described. The pans with their contents are then covered over with hot ashes or placed in an open fire to bake. The non-conducting material interposed between the food and fire prevents injury to the food from undue heat, and also prevents the inner wall from cooling by conduction, thus when once heated requiring but a small quantity of fuel to keep it at the same temperature.

My improved camp-baker, besides being much more convenient and economical than any form of stove, leaves the food in a better condition for use, as it prevents any of the aromatic or nutritive qualities of the food escaping in the form of vapor during the process of cooking.

The pans can be made of copper, cast-iron, or of any suitable metal, and can be made of a convenient size for carrying about in the hand.

Having thus described my invention, what I claim as new, and desire to secure by Letters Patent, is—

As a new article of manufacture, a camp pan and baker constructed with inner and outer walls, between which non-conducting material is interposed, and the utensil adapted to be used either as a common pan or as a baker, substantially as described.

CHAUNCEY BUSH.

Witnesses:
 JAMES LAIRD,
 R. SAWLEY.